US012500349B2

(12) United States Patent
Park et al.

(10) Patent No.: US 12,500,349 B2
(45) Date of Patent: Dec. 16, 2025

(54) ANTENNA MODULE CAPABLE OF SUPPORTING BROADBAND AND BASE STATION COMPRISING SAME

(71) Applicant: SAMSUNG ELECTRONICS CO., LTD., Suwon-si (KR)

(72) Inventors: Jungmin Park, Suwon-si (KR); Hyunjin Kim, Suwon-si (KR); Seungtae Ko, Suwon-si (KR); Yoongeon Kim, Suwon-si (KR); Bumhee Lee, Suwon-si (KR); Jungi Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 397 days.

(21) Appl. No.: 18/102,497

(22) Filed: Jan. 27, 2023

(65) Prior Publication Data

US 2023/0198161 A1 Jun. 22, 2023

Related U.S. Application Data

(63) Continuation of application No. PCT/KR2021/009876, filed on Jul. 29, 2021.

(30) Foreign Application Priority Data

Jul. 29, 2020 (KR) ........................ 10-2020-0094284

(51) Int. Cl.
*H01P 5/16* (2006.01)
*H01P 1/20* (2006.01)
(Continued)

(52) U.S. Cl.
CPC ......... *H01Q 21/0006* (2013.01); *H01Q 1/246* (2013.01); *H01Q 5/307* (2015.01); *H01Q 9/0421* (2013.01); *H01Q 21/26* (2013.01)

(58) Field of Classification Search
None
See application file for complete search history.

(56) References Cited

U.S. PATENT DOCUMENTS 6,313,809 B1 11/2001 Gabriel et al.
8,611,436 B2 12/2013 Knierim et al.
(Continued)

FOREIGN PATENT DOCUMENTS

CN 111463561 A 7/2020
CN 112467365 A * 3/2021 ............... H01Q 1/50
(Continued)

OTHER PUBLICATIONS

Communication issued on May 7, 2024 by the Korean Patent Office for KR Patent Application No. 10-2020-0094284.
(Continued)

*Primary Examiner* — Mohammed Rachedine
(74) *Attorney, Agent, or Firm* — Sughrue Mion, PLLC

(57) ABSTRACT

An antenna module includes: a first antenna unit, a second antenna unit, and a third antenna unit, each of the first antenna unit, the second antenna unit, and the third antenna unit including a first antenna element and a second antenna element that are crossed diagonally with each other; a first signal distributor configured to distribute a first radio frequency (RF) signal to the first antenna element of each of the first antenna unit, the second antenna unit, and the third antenna unit; a second signal distributor configured to distribute a second RF signal to the second antenna element of each of the first antenna unit, the second antenna unit, and the third antenna unit; and first stub circuits connected to line tracks of the first signal distributor connected to the first antenna unit, the second antenna unit, and the third antenna unit.

14 Claims, 12 Drawing Sheets

(51) Int. Cl.

| | |
|---|---|
| ***H01Q 1/24*** | (2006.01) |
| ***H01Q 5/307*** | (2015.01) |
| ***H01Q 5/50*** | (2015.01) |
| ***H01Q 9/04*** | (2006.01) |
| ***H01Q 21/00*** | (2006.01) |
| ***H01Q 21/24*** | (2006.01) |
| ***H01Q 21/26*** | (2006.01) |
| ***H01Q 21/28*** | (2006.01) |

(56) References Cited

U.S. PATENT DOCUMENTS

| | | | | |
|---|---|---|---|---|
| 9,525,212 | B2 | 12/2016 | Peng et al. | |
| 10,389,018 | B2 | 8/2019 | Daojian et al. | |
| 2002/0118075 | A1* | 8/2002 | Ohwada | H01Q 21/30 333/32 |
| 2010/0227646 | A1* | 9/2010 | Ogawa | H01Q 21/08 455/562.1 |
| 2013/0049900 | A1* | 2/2013 | Chung | H01Q 1/38 333/204 |
| 2015/0214592 | A1* | 7/2015 | Peng | H01Q 21/0075 343/821 |
| 2019/0115672 | A1 | 4/2019 | Zimmerman et al. | |
| 2019/0157762 | A1* | 5/2019 | Shibata | H01Q 9/0407 |

FOREIGN PATENT DOCUMENTS

| | | | | | |
|---|---|---|---|---|---|
| CN | 113540787 | A | * | 10/2021 | H01Q 1/44 |
| CN | 115461934 | A | * | 12/2022 | H01Q 1/36 |
| JP | 2011-030189 | A | | 2/2011 | |
| JP | 6917588 | B2 | * | 8/2021 | H01P 5/16 |
| KR | 10-0951157 | B1 | | 4/2010 | |
| KR | 10-2010-0095965 | A | | 9/2010 | |
| KR | 10-1070009 | B1 | | 10/2011 | |
| KR | 10-2013-0112518 | A | | 10/2013 | |
| KR | 10-2015-0060878 | A | | 6/2015 | |
| KR | 10-2001-0108226 | A | | 12/2021 | |
| WO | WO-0197323 | A1 | * | 12/2001 | H01Q 11/08 |
| WO | WO-2011020845 | A1 | * | 2/2011 | H01P 1/2135 |

OTHER PUBLICATIONS

International Search Report (PCT/ISA/210) issued Nov. 5, 2021 by the International Searching Authority in International Patent Application No. PCT/KR2021/009876.

Written Opinion (PCT/ISA/237) issued Nov. 5, 2021 by the International Searching Authority in International Patent Application No. PCT/KR2021/009876.

* cited by examiner

ANTENNA MODULE CAPABLE OF SUPPORTING BROADBAND AND BASE STATION COMPRISING SAME

CROSS-REFERENCE TO RELATED APPLICATIONS

This application is a by-pass continuation application of International Application No. PCT/KR2021/009876, filed on Jul. 29, 2021, which based on and claims priority to Korean Patent Application No. 10-2020-0094284, filed on Jul. 29, 2020, in the Korean Intellectual Property Office, the disclosures of which are incorporated by reference herein in their entireties.

BACKGROUND

1. Field

The present disclosure relates to an antenna module for supporting broadband in a next-generation communication technology and a base station comprising the same.

2. Description of Related Art

Efforts are being made to develop an improved fifth generation (5G) communication system or a pre-5G communication system in order to meet the increasing demand for wireless data traffic after the commercialization of a fourth generation (4G) communication system. For this reason, the 5G communication system or the pre-5G communication system is called a communication system after the 4G network (Beyond 4G Network) or system after Long Term Evolution (LTE) system (Post LTE). To achieve a high data rate, the 5G communication system is considered for implementation in a super high frequency (mmWave) band (e.g., such as a 60 GHz band). To alleviate the path loss of radio waves in the super high frequency band and increase the transmission distance of radio waves, in the 5G communication system, beamforming, massive Multiple-Input Multiple-Output (MIMO), Full Dimensional MIMO: FD-MIMO, array antenna, analog beam-forming, and large scale antenna technologies are discussed. In addition, to improve the network of the system, in the 5G communication system, technologies such as evolved small cell, advanced small cell, cloud radio access network: cloud Radio Access Network (RAN), ultra-dense network, Device to Device (D2D) communication, wireless backhaul, moving network, cooperative communication, Coordinated Multi-Points, interference cancellation, and the like are being developed. In addition, in 5G system, Advanced Coding Modulation (ACM) methods such as Hybrid FSK and QAM Modulation (FQAM) and Sliding Window Superposition Coding (SWSC), advanced connection technologies such as Filter Bank Multi Carrier (FBMC), non-orthogonal multiple access (NOMA), and sparse code multiple access (SCMA) are being developed.

The Internet has been evolving from a human-centered network in which humans generate and consume information to an Internet of Things (IoT) network that exchanges and processes information between distributed components such as objects. Internet of Everything (IoE) technology, which combines Big-data processing technology through connection with cloud servers, and the like. with IoT technology, is also emerging. Technology elements such as sensing technology, wired and wireless communication and network infrastructure, service interface technology, and security technology are required to implement IoT, and recently, technologies such as sensor network, Machine To Machine (M2M), and Machine Type Communication (MTC) for connection between objects have been studied. In an IoT environment, intelligent IT (Internet Technology) services that create new values in human life by collecting and analyzing data generated from connected objects may be provided. IoT may be applied to field such as smart home, smart building, smart city, smart car or connected car, smart grid, health care, smart home appliance, and advanced medical service, and the like. through convergence and combination between existing IT (Information Technology) and various industries.

Accordingly, various attempts have been made to apply the 5G communication system to the IoT network. For example, technologies such as sensor network, M2M, and MTC are implemented by 5G communication techniques such as beamforming, MIMO, and array antenna. The application of cloud wireless access network (cloud RAN) as a big data processing technology described above may be an example of the convergence of 5G technology and IoT technology.

In a case that a base station supports various frequency bands in a communication system, for example, in a case that one base station supports a 2.3 GHz band of LTE and a 3.5 GHz band of 5G, a method of supporting communication in all bands by using one antenna module without having antenna modules for communication in each band is being sought. In FIG. 1, the base station may each have an antenna module for transmitting and receiving signals in each frequency band, such as 100 and 110, but may have one antenna module for transmitting and receiving signals in a broadband including a plurality of frequency bands, such as 120.

As described above, in a case that a base station intends to support broadband communication including a plurality of frequency bands by using one antenna module, problems that the gain may be unstable, and the phase of the signal may not remain stable may occur.

Accordingly, one or more embodiments of the present disclosure propose a configuration of an antenna module capable of performing stable signal transmission and reception by applying a technology that supports broadband communication include a plurality of frequency bands by using one antenna module.

SUMMARY

According to an aspect of the disclosure, an antenna module includes: a first antenna unit, a second antenna unit, and a third antenna unit, each of the first antenna unit, the second antenna unit, and the third antenna unit including a first antenna element and a second antenna element that are crossed diagonally with each other; a first signal distributor configured to distribute a first radio frequency (RF) signal to the first antenna element of each of the first antenna unit, the second antenna unit, and the third antenna unit; a second signal distributor configured to distribute a second RF signal to the second antenna element of each of the first antenna unit, the second antenna unit, and the third antenna unit; and first stub circuits connected to line tracks of the first signal distributor connected to the first antenna unit, the second antenna unit, and the third antenna unit.

The first antenna unit and the second antenna unit may be spaced apart from each other by a predetermined distance, and the third antenna unit may be disposed at a center between the first antenna unit and the second antenna unit.

The first RF signal distributed by the first signal distributor may be supplied the first antenna element of each of the first antenna unit, the second antenna unit, and the third antenna unit through a power supply unit formed in a first direction of the first antenna element of each of the first antenna unit, the second antenna unit, and the third antenna unit.

The second RF signal distributed by the second signal distributor may be supplied to the second antenna element of each of the first antenna unit and the second antenna unit through a power supply unit formed in a first direction of the second antenna element of each of the first antenna unit and the second antenna unit and to the second antenna element of the third antenna unit through a power supply unit formed in a second direction of the second antenna element of the third antenna unit.

The first stub circuits may be connected to line tracks of the second signal distributor connected to the first antenna unit and the second antenna unit, and the antenna module may further include a second stub circuit configured to remove a phase offset and connected to a line track of the second signal distributor connected to the third antenna unit.

At least one of the first stub circuits may include an open stub circuit and a short stub circuit that are connected in parallel to an one end of a high-impedance short-line element.

The second stub circuit may include an open stub circuit and a short stub circuit that are connected in parallel to both ends of a high-impedance short-line element.

According to an aspect of the disclosure, a base station includes: an antenna module including: a first antenna unit, a second antenna unit, and a third antenna unit, each of the first antenna unit, the second antenna unit, and the third antenna unit including a first antenna element and a second antenna element that are crossed diagonally with each other; a first signal distributor configured to distribute a first radio frequency (RF) signal to the first antenna element of each of the first antenna unit, the second antenna unit, and the third antenna unit; a second signal distributor configured to distribute a second RF signal to the second antenna element of each of the first antenna unit, the second antenna unit, and the third antenna unit; and first stub circuits connected to line tracks of the first signal distributor connected to the first antenna unit, the second antenna unit, and the third antenna unit.

The first antenna unit and the second antenna unit may be spaced apart from each other by a predetermined distance, and the third antenna unit may be disposed at a center between the first antenna unit and the second antenna unit.

The first RF signal distributed by the first signal distributor may be supplied the first antenna element of each of the first antenna unit, the second antenna unit, and the third antenna unit through a power supply unit formed in a first direction of the first antenna element of each of the first antenna unit, the second antenna unit, and the third antenna unit.

The second RF signal distributed by the second signal distributor may be supplied to the second antenna element of each of the first antenna unit and the second antenna unit through a power supply unit formed in a first direction of the second antenna element of each of the first antenna unit and the second antenna unit and to the second antenna element of the third antenna unit through a power supply unit formed in a second direction of the second antenna element of the third antenna unit.

The first stub circuits may be connected to line tracks of the second signal distributor connected to the first antenna unit and the second antenna unit, and the antenna module may further include a second stub circuit configured to remove a phase offset and connected to a line track of the second signal distributor connected to the third antenna unit.

At least one of the first stub circuits may include an open stub circuit and a short stub circuit that are connected in parallel to an one end of a high-impedance short-line element.

The second stub circuit may include an open stub circuit and a short stub circuit that are connected in parallel to both ends of a high-impedance short-line element.

According to various embodiments of the present disclosure, broadband communication comprising a plurality of frequency bands can be stably supported through one antenna module, thereby reducing antenna installation space and facility investment costs.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
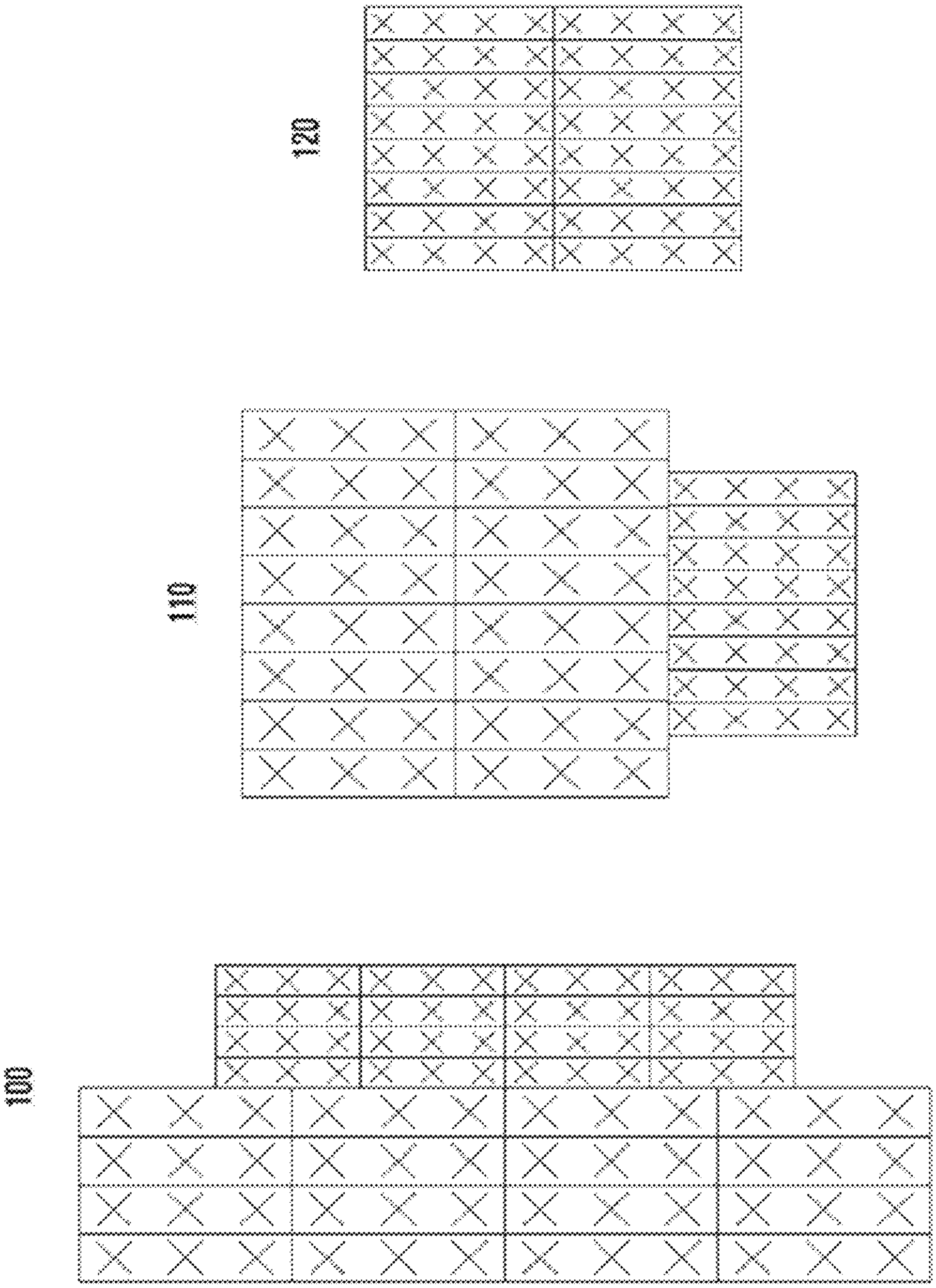
FIG. 1 illustrates a configuration of an antenna module supporting a plurality of bands.

In describing embodiments of the present disclosure, a description of technical contents that is well known in the technical field to which the present disclosure belongs and are not directly related to the present disclosure will be omitted. This is to convey the gist of the present disclosure more clearly without blurring by omitting an unnecessary description.

For the same reason, some components are exaggerated, omitted, or schematically illustrated in the accompanying drawings. In addition, the size of each component does not fully reflect the actual size. The same reference number was assigned to the same or corresponding components in each drawing.

An advantage and a feature of the present disclosure and a method for achieving them will become apparent with reference to embodiments described below in detail together with the accompanying drawings. However, the present disclosure is not limited to the embodiments disclosed below, but may be implemented in various forms, only the present embodiments are provided so that the disclosure of the present disclosure is complete, and to fully inform those of ordinary skill in the art to which the present disclosure belongs to the scope of the disclosure, and the present disclosure is only defined by the scope of the claims. The same reference numerals refer to the same components throughout the specification.

In this case, it will be understood that each block of processing flowchart drawings and combinations of flowchart drawings may be performed by computer program instructions. Since these computer program instructions may be mounted on a processor of a general-purpose computer, a special purpose computer, or other programmable data processing equipment, the instructions performed through the processor of the computer or other programmable data processing equipment create a mean to perform the functions described in the flowchart block(s). Since these computer program instructions is also possible to be stored in a computer-usable or computer-readable memory that may aim a computer or other programmable data processing equipment to implement a function in a particular method, the instructions stored in the computer-usable or computer-readable memory is also possible to produce manufactured items including instruction means that perform functions described in the flowchart block(s). Since the computer program instructions may also be mounted on a computer or other programmable data processing equipment, instructions for performing a computer or other programmable data processing equipment by performing a series of operational steps on a computer or other programmable data processing equipment and generating a computer-executed process may provide steps for executing the functions described in the flowchart block(s).

In addition, each block may represent a module, segment, or a part of code including one or more executable instructions for executing a specific logical function(s). It should also be noted that, in some alternative implementation examples, it is possible for the functions mentioned in the blocks to occur out of order. For example, it is possible that two blocks illustrated in succession are actually performed substantially simultaneously, or that the blocks are sometimes performed in reverse order according to the corresponding function.

In this case, the term '~ unit' used in the present embodiment refers to software or hardware components such as FPGA or ASIC, and the '~ unit' performs certain roles. However, the '~ unit' is not limited to software or hardware. The '~ unit' may be configured to be in an addressable storage medium or may be configured to play one or more processors. Thus, as an example, the '~ unit' comprises software components, object-oriented software components, components such as class components and task components, processes, functions, attributes, procedures, subroutines, segments of program code, drivers, firmware, microcode, circuits, data, database, data structures, tables, arrays, and variables. The functions provided in components and '~ unit's may be combined into a smaller number of components and '~ unit's or further separated into additional components and '~ unit's. In addition, the components and the '~ unit's may be implemented to play one or more CPUs in the device or secure multimedia card. In addition, in an embodiment, the '~ unit' may comprise one or more processors.

FIG. 1 is a diagram illustrating a configuration of an antenna module supporting a plurality of bands.

According to one or more embodiments of the present disclosure, the base station may comprise an antenna module for transmitting and receiving signals, and each antenna module may comprise a plurality of antenna subarrays 210. In the antenna subarray 210 according to an embodiment of this disclosure, three antenna units 200 are disposed in series, and radio frequency (RF) signals are distributed through the first signal distributor 217 and the second signal distributor 219 to be supplied to each antenna unit 200 through a power supply unit of a dipole antenna (an example of an antenna element according to the present disclosure). Each of the first signal distributor 217 and the second signal distributor 219 may be, for example, a T-junction power divider.

According to an embodiment of the present disclosure, an antenna unit 200 may include antenna elements, such as a first dipole antenna 201 and a second dipole antenna 203 that is crossed diagonally with the first dipole antenna 201. In this case, it is not limited to the dipole antenna, and may be replaced with various antenna elements such as a patch antenna and the like. For example, according to one or more embodiments of the present disclosure, an antenna unit may include the antenna elements crossed each other diagonally FIG. 1 shows the dipole antenna, as an example of the antenna element.

Each dipole antenna may be divided up and down or left and right based on the center of the antenna, and when dividing respectively them into the first direction and the second direction, the phase difference of the RF signal forms 180 degrees in a case that an RF signal is supplied from a power supply unit formed in the first direction, and in a case that an RF signal is supplied from a power supply unit formed in the second direction.

Figure 2:
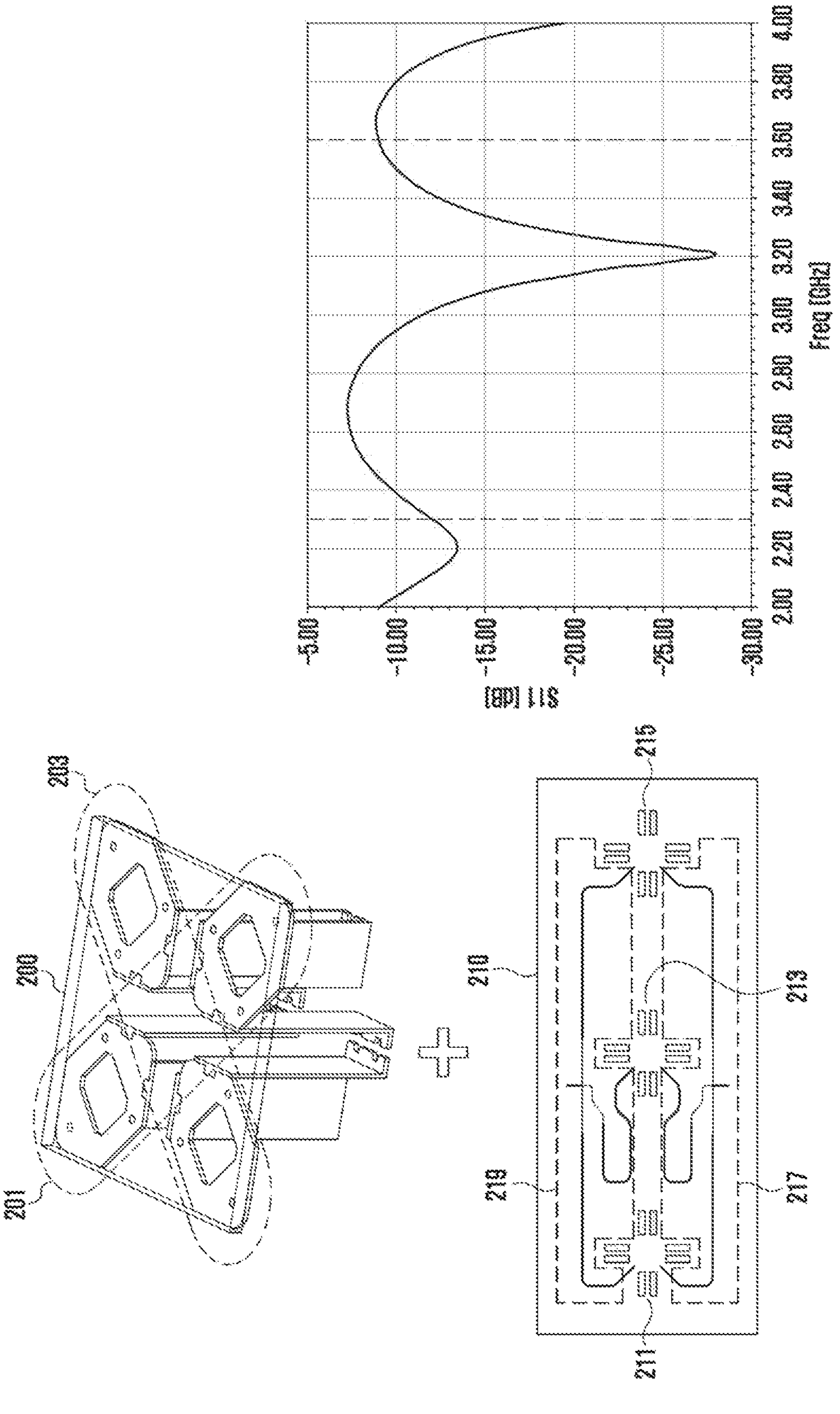
FIG. 2 illustrates an antenna unit, a signal distributor for distributing signals to an antenna subarray comprising the same, and performance thereof.

Referring to FIG. 2, the antenna subarray 210 may include, for example, the first signal distributor 217 and the second signal distributor 219 printed with a microstrip line on a printed circuit board (PCB) substrate. The antenna unit 200 may be attached to each of the conductive patches 211, 213, and 215 formed on the PCB substrate. In this case, the RF signal distributed from the first signal distributor 217 and the second signal distributor 219 may be supplied to each antenna unit 200. For example, the RF signal distributed from the first signal distributor 217 may be supplied through the power supply unit of the first dipole antenna 201 of each antenna unit, and the RF signal distributed from the second signal distributor 219 may be supplied through the power supply unit of the second dipole antenna 203 of each antenna unit. In the antenna subarray 210, the first signal distributor 217 may supply power in a predetermined direction (e.g., a first direction) of each first dipole antenna 201, and the second signal distributor may supply power in a predetermined direction (e.g., a first direction) of each second dipole antenna 203.

However, the antenna subarrays 210 include the first signal distributor 217 and the second signal distributor 219. For example, in a case that the antenna subarrays 210 are designed to support the 3.5 Ghz band, the antenna subarrays 210 perform signal transmission and reception performance only in the corresponding frequency band. For example, even in a case that the antenna supports a plurality of frequency bands as illustrated in the frequency band 120 in FIG. 1, the antenna subarray 210 may not guarantee the signal transmission and reception performance in a plurality of frequency bands, for example, the 3.5 GHz band and the 2.3 GHz band. Therefore, it is important to improve the antenna subarray 210 to ensure the signal transmission and reception performance in a plurality of frequency bands.

Figure 3:
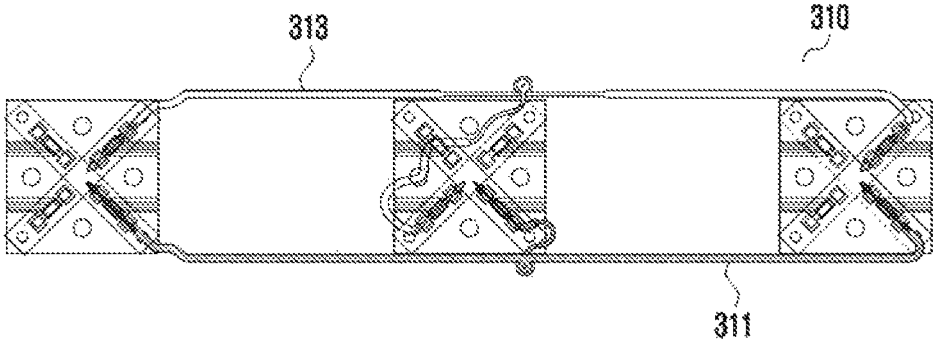
FIG. 3 illustrates a phase offset problem that may occur during phase adjustment to support a broadband.
Figure 3:
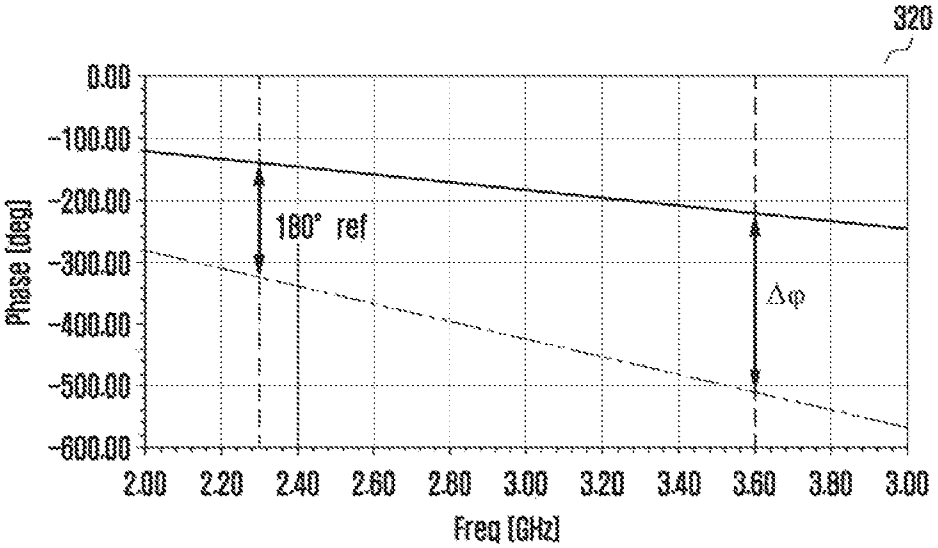

FIG. 3 is a diagram illustrating a phase offset problem that may occur during phase adjustment to support a broadband.

Referring to FIG. 3, the antenna subarray 310 may include a first signal distributor 311 and a second signal distributor 313. As a way to ensure transmission and reception performance in a broadband including a plurality of frequency bands, with respect to one signal distributor, for example, the second signal distributor 313, the direction of supplying power the RF signal to the second dipole antenna of the centrally located antenna unit may be disposed opposite to the direction of supplying power the RF signal to the second dipole antenna of the antenna unit located on both sides.

For example, when the supplying power direction of the second dipole antenna of the antenna unit located on both sides is the first direction, the supplying power direction of the second dipole antenna of the centrally located antenna unit may be the second direction. Through this disposition, the phase of the signal transmitted and received through the centrally located antenna unit may be adjusted 180 degrees different from the signal transmitted and received through the antenna unit located on both sides. By doing this, performance in a broadband may be improved.

However, as illustrated in FIG. 3, for example, when the design frequency band is 2.3 GHz, the phase difference is 180 degrees in the corresponding frequency band, but a phase offset may occur in other frequency bands (e.g., 3.5 GHz) and the phase difference may be distorted. For example, the phase difference may be distorted by 280 degrees as illustrated. As the phase is distorted in this way, the gain of the antenna may be reduced, and problems of Side Lobe Level (SLL) and Front-to-Back Ratio (FBR) may occur.

Therefore, it is important to design the antenna subarray so that phase offset does not occur while supporting broadband. One or more embodiments of the present disclosure provide a method for solving the above problem by connecting an additional line track, such as an additional stub circuit, to a signal distributor.

Figure 4:
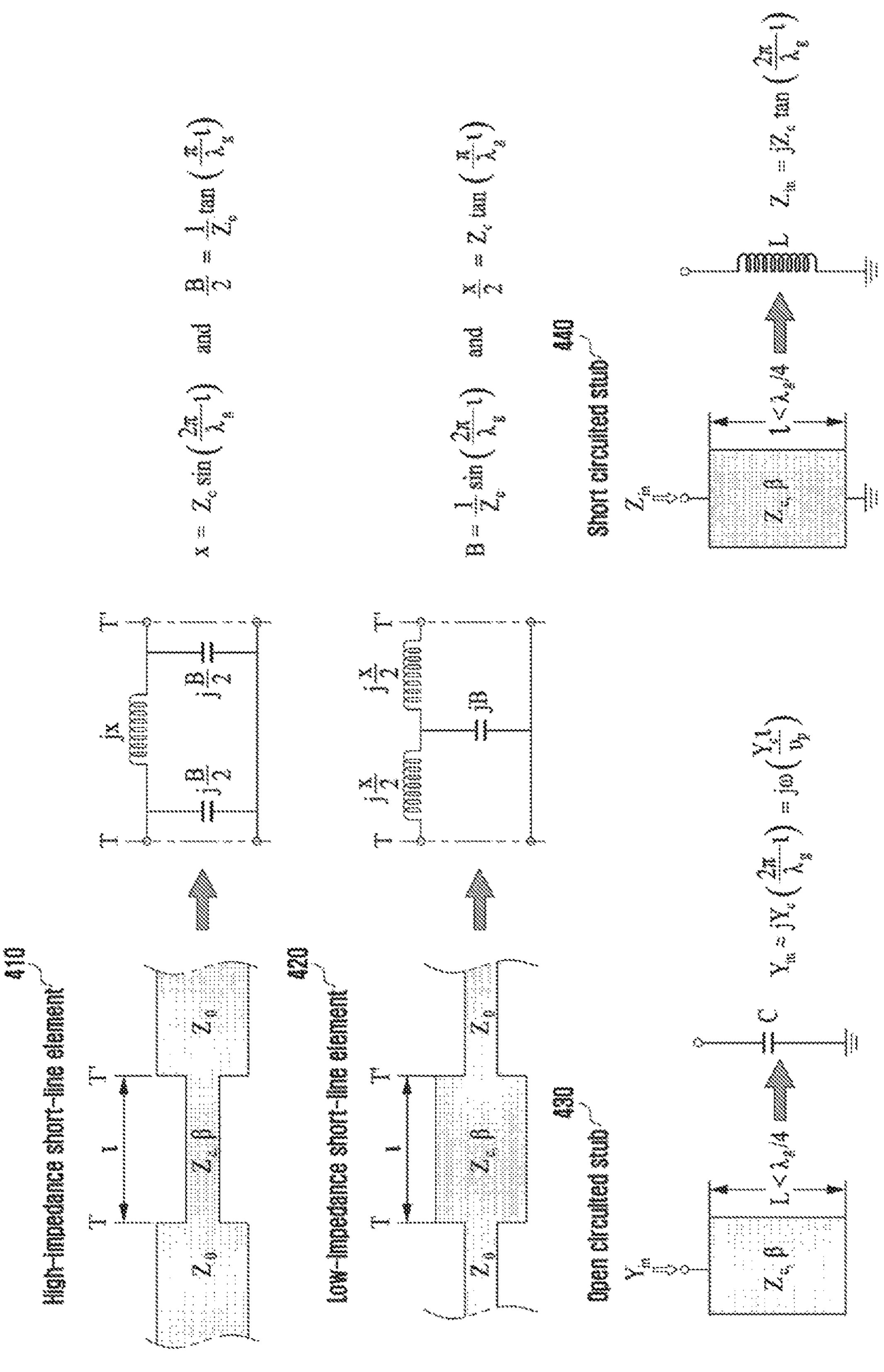
FIG. 4 illustrates an equivalent circuit of a line track usable in one or more embodiments of the present disclosure.

FIG. 4 is a diagram illustrating an equivalent circuit of a line track usable in one or more embodiments of the present disclosure. For example, an example of a line track that may be added to a signal distributor according to one or more embodiments of the present disclosure.

The reference numeral 410 illustrates a high-impedance short line element. The reference numeral 420 illustrates a low-impedance short line element. The reference numeral 430 illustrates an open circuit stub, for short, an open stub. The reference numeral 440 illustrates a short circuit stub, for short, short circuit stub.

Figure 5A:
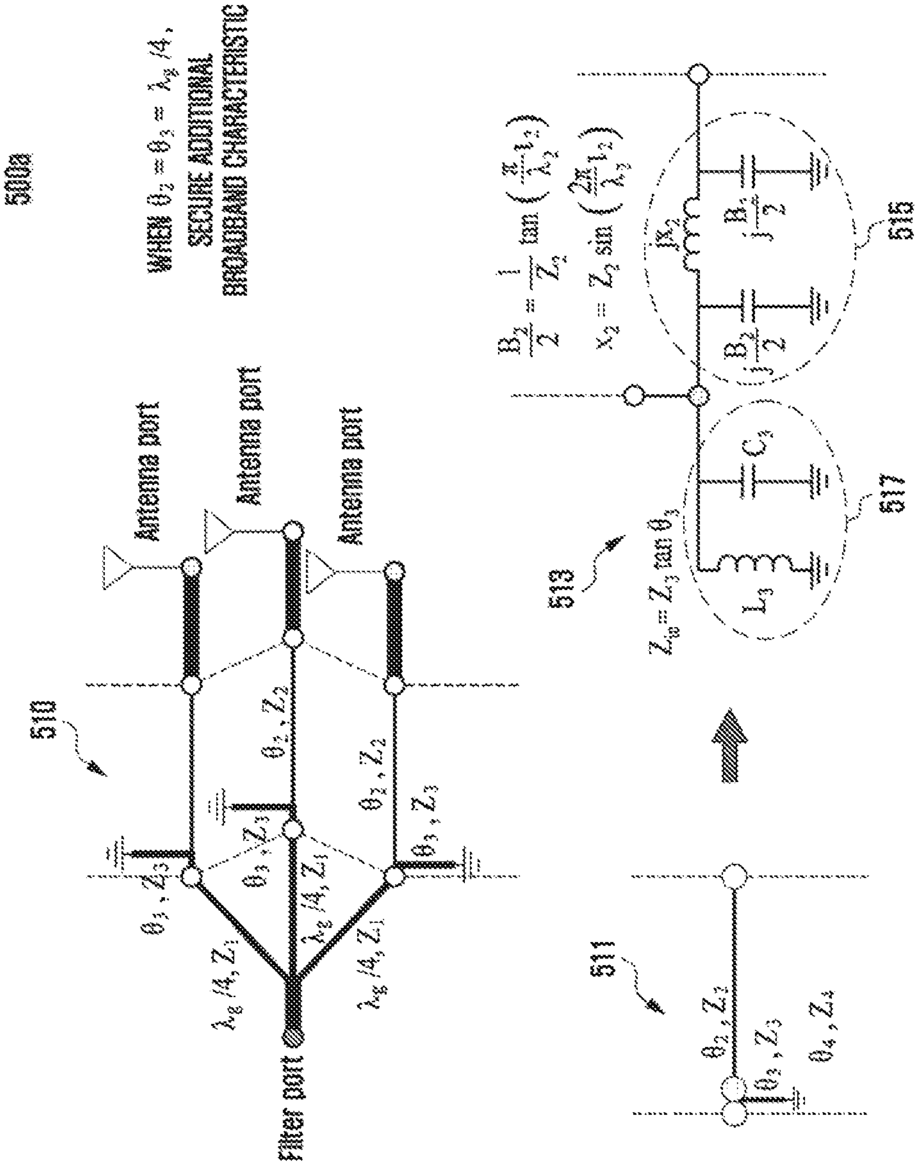
FIG. 5A illustrates a signal distributor for supporting a broadband comprising a plurality of bands according to an embodiment of the present disclosure.

FIG. 5A is a diagram illustrating a signal distributor for supporting a broadband comprising a plurality of bands according to an embodiment of the present disclosure.

The reference numeral 500*a* illustrates an example of a signal distributor that distributes an RF signal input through a filter port to each antenna port to be supplied to three antenna units.

In the signal distributor, a stub circuit may be additionally connected to the line track of the signal distributor in FIGS. 2 and 3. The added stub circuit may include, for example, at least one of the circuits described in FIG. 4. In the reference numeral 510, the stub circuit is connected to at least one line track (all three line tracks in the drawing) distributed to be connected to three antenna units. The reference numeral 511 shows selecting one line track to which the stub circuit is connected, and the reference numeral 513 is an equivalent circuit of the reference numeral 511. The reference numeral 515 includes a high impedance short line element as an equivalent circuit of a line track, and the stub circuit connected thereto may include an open stub and a shot stub circuit connected in parallel as illustrated in the stub circuit 517.

Figure 5B:
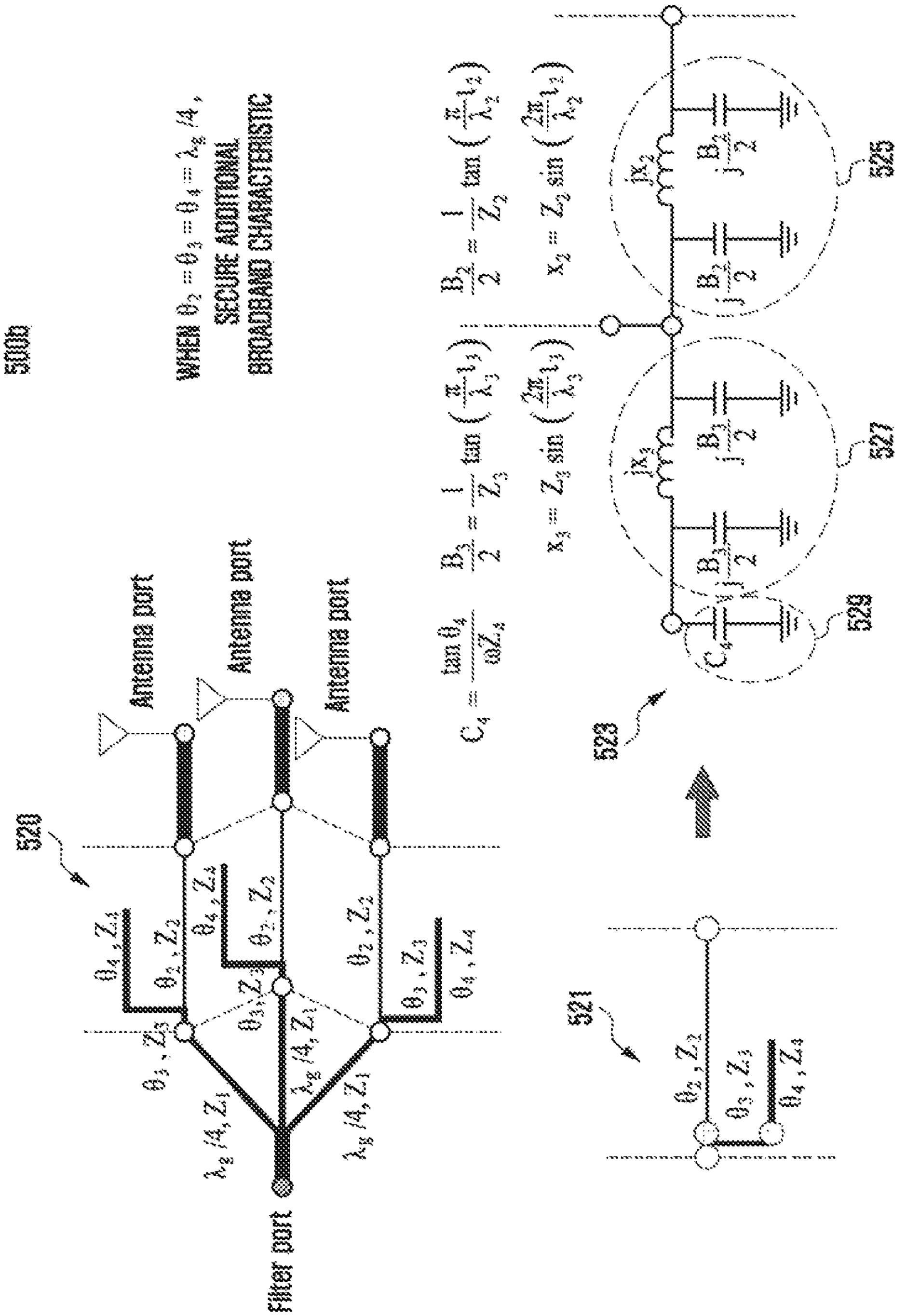
FIG. 5B illustrates a signal distributor for supporting a broadband comprising a plurality of bands according to another embodiment of the present disclosure.

FIG. 5B is a diagram illustrating a signal distributor for supporting a broadband comprising a plurality of bands according to another embodiment of the present disclosure.

The reference numeral 500*b* indicates an example of a signal distributor that distributes the RF signal input through the filter port to each antenna port to supply the three antenna units.

In the signal distributor, a stub circuit may be additionally connected to the line track of the signal distributor described above in FIGS. 2 and 3. The added stub circuit may include, for example, at least one of the circuits described in FIG. 4. In the reference numeral 520, the stub circuit is connected to at least one line track (all three line tracks in the drawing) distributed to be connected to three antenna units. The reference numeral 521 selects one line track to which the stub circuit is connected. The reference numeral 523 indicates an equivalent circuit of the reference numeral 521. The reference numeral 525 includes a high impedance short line element as an equivalent circuit of a line track, and a stub circuit connected thereto may include a high impedance short line element and an open stub circuit 529 as a stub circuit 527.

Figure 6A:
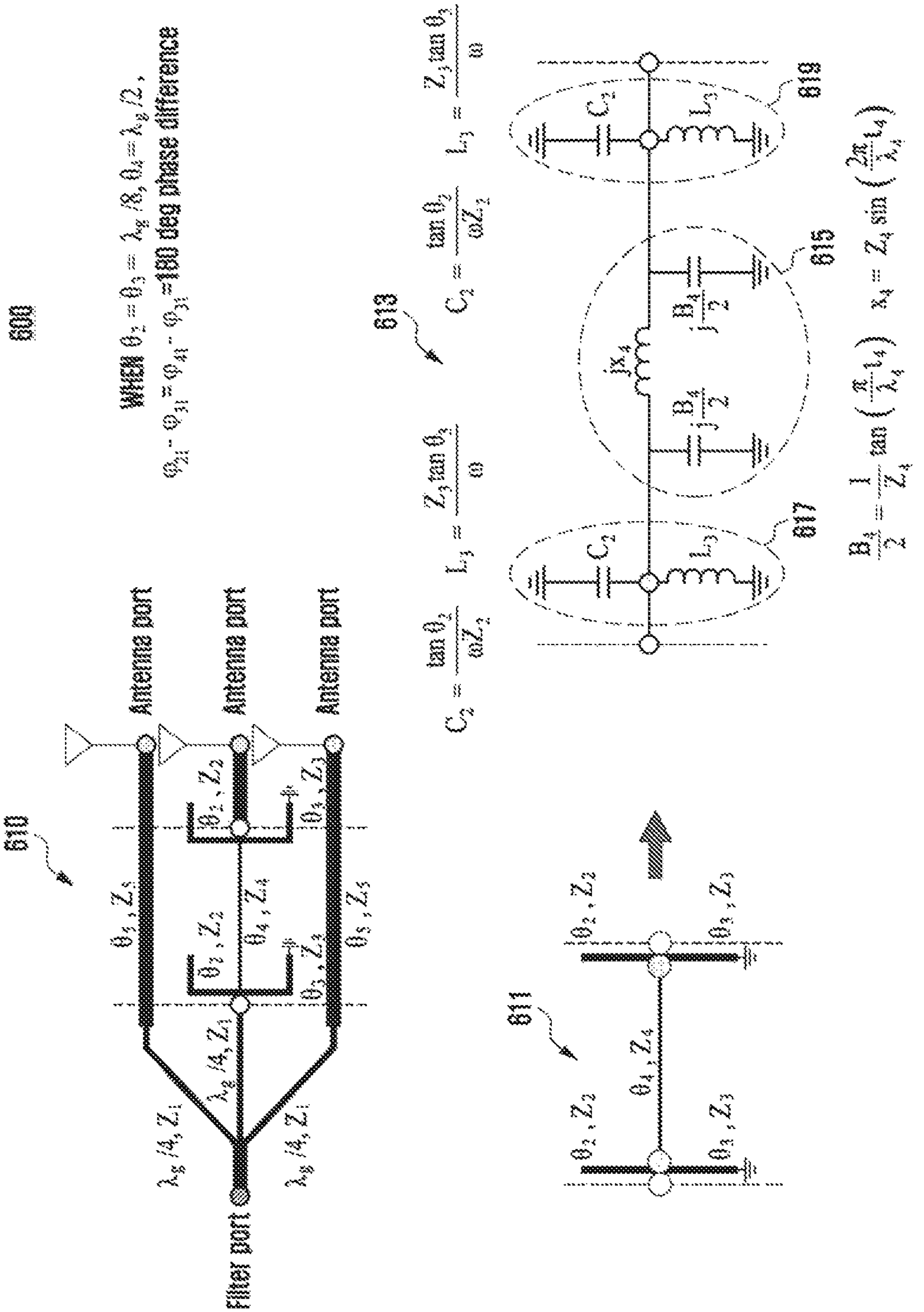
FIG. 6A illustrates a signal distributor for solving a phase offset problem according to an embodiment of the present disclosure.
Figure 6B:
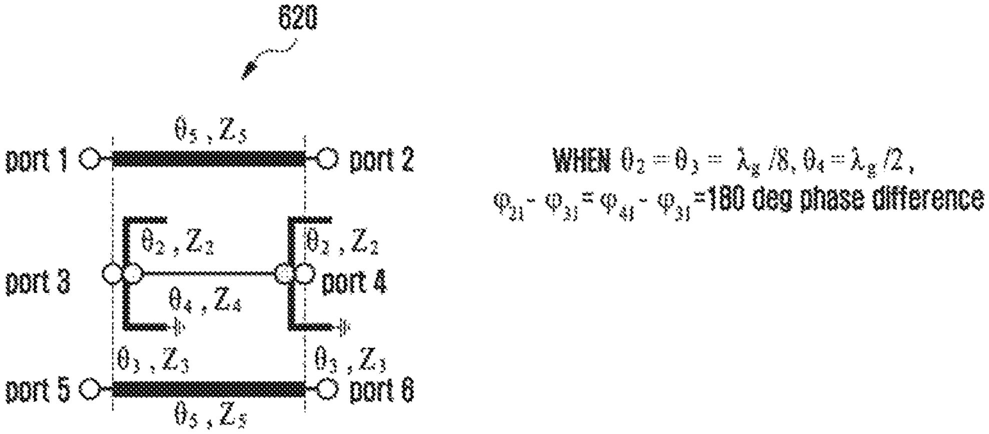
FIG. 6B illustrates a signal distributor for solving a phase offset problem according to an embodiment of the present disclosure.

FIGS. 6A and 6B are diagrams illustrating signal distributors for solving a phase offset problem according to an embodiment of the present disclosure.

Referring to FIG. 6A, the reference numeral 600*a* illustrates an example of a signal distributor that distributes an RF signal input through a filter port to each antenna port so as to be supplied to three antenna units.

In the signal distributor, a stub circuit is additionally connected to the line track of the signal distributor (e.g., 313) described above in FIG. 3. The added stub circuit may include, for example, at least one of the circuits described in FIG. 4. In the reference numeral 610, a stub circuit is connected to a line track distributed to be connected to the center of three antenna units. The reference numeral 611 is selecting a line track to which the stub circuit is connected, and the reference numeral 613 is indicating an equivalent circuit of the reference numeral 611. The reference numeral 615 includes a high impedance short line element as an equivalent circuit of the line track, and a stub circuit connected to both ends thereof may include an open stub and a short stub circuit connected in parallel as illustrated in the stub circuits 617 and 619.

Referring to FIG. 6B and the equation below disclose that the phase offset problem is solved by the signal distributor.

In the reference numeral 620, in a case that the phase difference between S_21 and S_43 converges to 180 degrees (π), the phase offset problem does not occur.

[Equation 1]

$$S_{11} = S_{22} = S_{55} = S_{66} = 0$$

$$S_{22} = S_{65} = (\cos\theta_5 - j\sin\theta_5)$$

$$S_{43} = \frac{1}{2}\left\{\frac{1 - j\left(Y_4\tan\frac{\theta_4}{2} - 2Y_2\cot 2\theta_2\right)}{1 + j\left(Y_4\tan\frac{\theta_4}{2} - 2Y_2\cot 2\theta_2\right)} - \frac{1 + j\left(Y_4\cot\frac{\theta_4}{2} + 2Y_2\cot 2\theta_2\right)}{1 - j\left(Y_4\cot\frac{\theta_4}{2} + 2Y_2\cot 2\theta_2\right)}\right\} \Rightarrow$$

$$\Delta\phi_T(f) = \arg(S_{21}) - \arg(S_{43}) =$$

$$-\theta_5(f) - \pi - \tan^{-1}\left(\frac{1 + Y_4^2 + 2Y_2\cot 2\theta_2\left(Y_4\tan\frac{\theta_4}{2} - Y_4\cot\frac{\theta_4}{2}\right) - (2Y_2\cot 2\theta_2)^2}{Y_4\tan\frac{\theta_4}{2} - Y_4\cot\frac{\theta_4}{2} - 4Y_2\cot 2\theta_2}\right)$$

$$\theta_4 = \pi\bar{f} \quad \theta_2 = 0.25\pi\bar{f} \quad \theta_5 = [\pi + \Delta\phi_T(f_0)]\bar{f}$$

As a result of calculating the phase difference $\Delta\phi_T(f)$ between S21 and S43 of the signal distributor to which the additional stub circuit of the reference numeral 620 is connected as above, it converges to π regardless of the frequency. Therefore, the phase offset problem may be solved by using the signal distributor.

Figure 7:
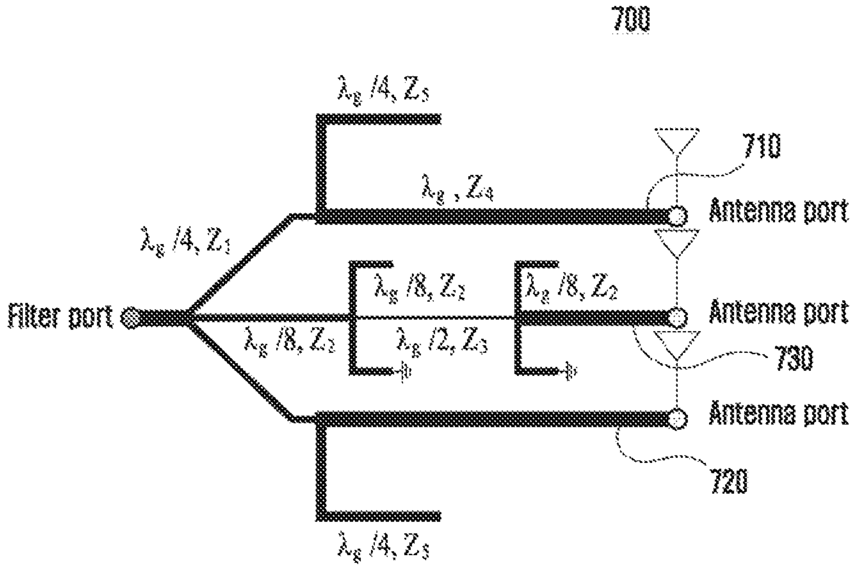
FIG. 7 illustrates a signal distributor capable of supporting a broadband without a phase offset according to an embodiment of the present disclosure.

FIG. 7 is a diagram illustrating a signal distributor capable of supporting a broadband without a phase offset according to an embodiment of the present disclosure.

The present embodiment proposes a signal distributor that may maintains gains in a broadband including a plurality of frequency bands and a phase offset problem does not occur.

Referring to FIG. 7, the reference numeral 700 indicates an example of a signal distributor that distributes RF signals input through filter ports to each antenna port to be supplied to three antenna units.

In the signal distributor, a stub circuit may be additionally connected to the line track of the signal distributor (e.g., 313) described above in FIG. 3. In the reference numeral 610, a stub circuit is connected to a line track distributed to be connected to the center of three antenna units. As illustrated in reference numerals 710 and 720, a stub circuit connected to a line track distributed to antenna units located on both sides among the three antenna units may include the stub circuit 517, 527, or 529 described above in FIGS. 5A and 5B. As illustrated in reference numeral 730, the stub circuit connected to the line track distributed to the centrally located antenna unit among the three antenna units may include the stub circuits 617 and 619 described above in FIG. 6A. In this case, the added element-related impedance may be appropriately adjusted.

Figure 8:
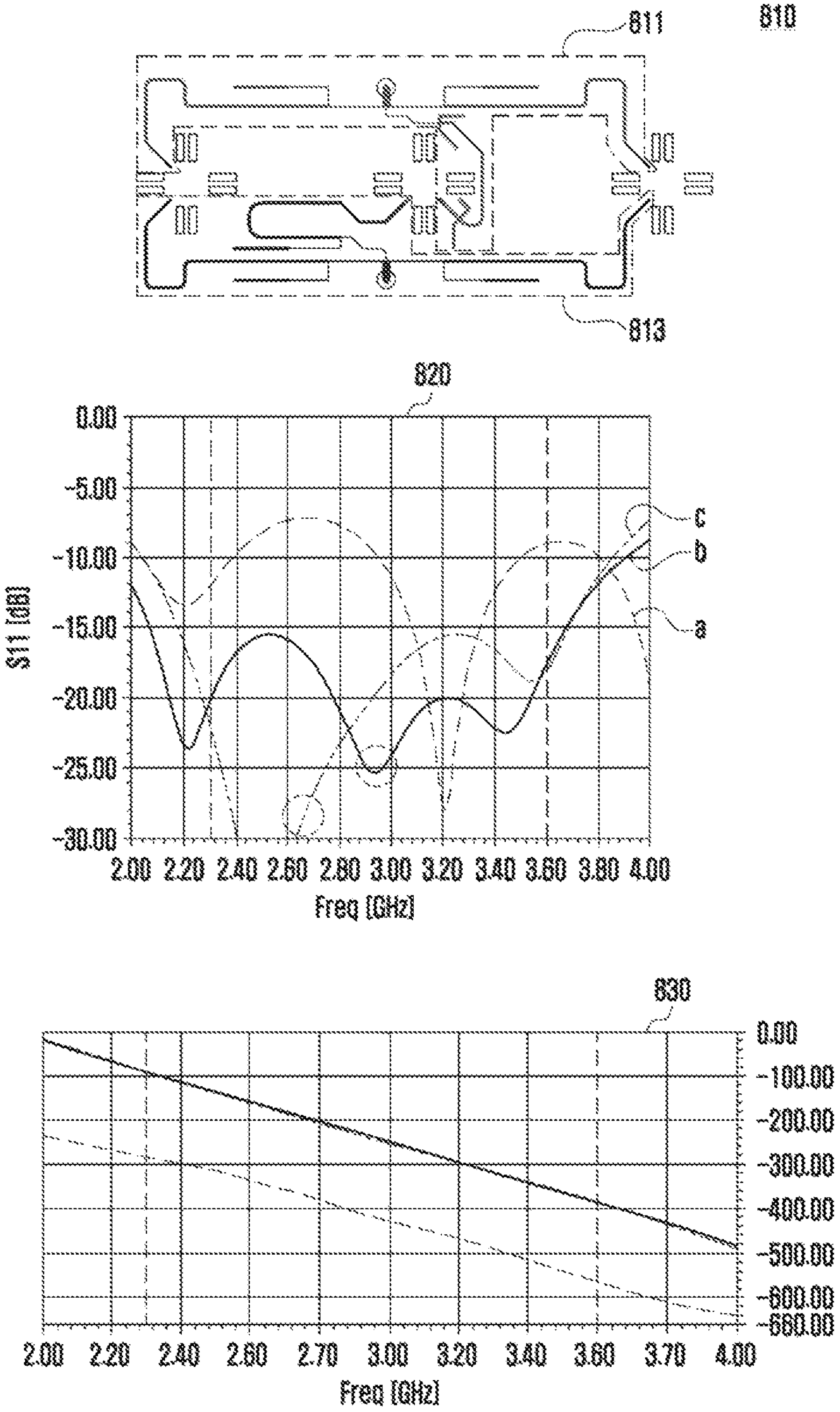
FIG. 8 illustrates an antenna subarray capable of supporting a broadband without a phase offset according to an embodiment of the present disclosure.

FIG. 8 is a diagram illustrating an antenna subarray capable of supporting a broadband without a phase offset according to an embodiment of the present disclosure.

Referring to FIG. 8, the antenna subarray 810 may include the first signal distributor 811 and the second signal distributor 813.

The RF signal distributed by the first signal distributor 811 may be supplied through a power supply unit of the first dipole antenna of each antenna unit. The first signal distributor 811 may include an additional stub circuit to ensure transmission/reception gain in a broadband. The first signal distributor 811 may be, for example, a circuit illustrated in FIG. 5A or 5B. In this case, the first signal distributor 811 may supply RF signals to antenna units in a predetermined direction (e.g., a first direction) of each first dipole antenna.

The RF signal distributed by the second signal distributor 813 may be supplied through a power supply unit of the second dipole antenna 203 of each antenna unit. The second signal distributor 813 may include an additional stub circuit to solve a phase offset problem while ensuring transmission/reception gain in a broadband. The second signal distributor 813 may be, for example, a circuit illustrated in FIG. 7. In this case, the second signal distributor 813 may be disposed so that a direction (first direction) of supplying power to the second dipole antenna of the centrally located antenna unit is opposite to a direction (second direction) of supplying power to the second dipole antenna of the antenna unit located on both sides. For example, the first direction and the second direction may differ by 180 degrees.

The reference numeral 820 indicates a reflection coefficient S11 obtained when a signal is transmitted and received through the antenna subarray of the antenna subarray 810. In the past, transmission and reception gains could only be guaranteed at the design frequency (e.g., 3.5 GHz) as in "a." But in a case that the first signal distributor 811 and the second signal distributor 813 are used, a pole is added due to the influence of the open stub circuit as in "b" and "c," respectively. Thus, the bandwidth expansion effect occurs.

The reference numeral 830 indicates a signal phase of each antenna unit obtained when a signal is transmitted and received through the antenna subarray of the antenna subarray 810. As illustrated, the signal phase of the antenna unit located on both sides and the signal phase of the antenna unit located in the center are almost constantly maintained at 180 degrees regardless of the frequency band.

Figure 9A:
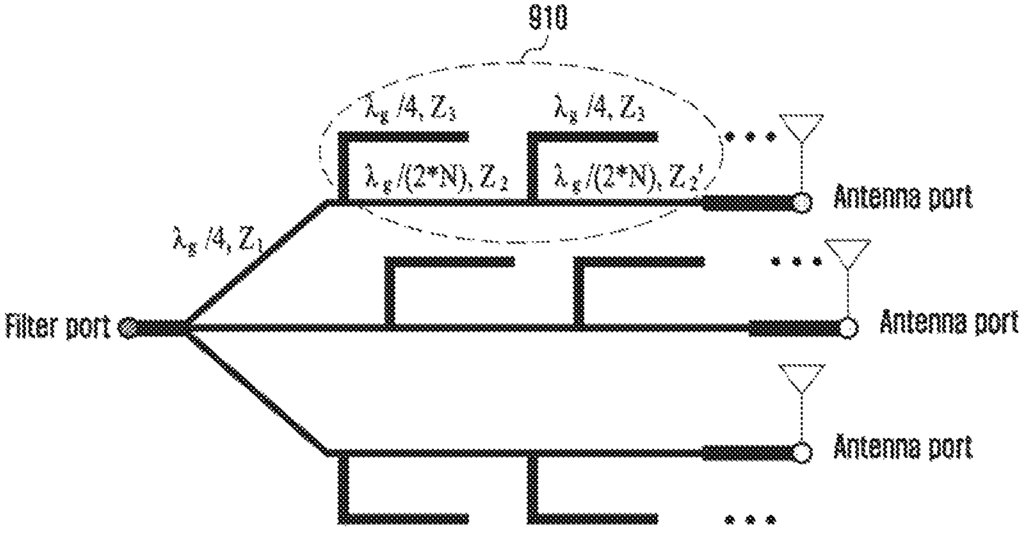
FIG. 9A illustrates an application example of a signal distributor for supporting a broadband comprising a plurality of bands according to an embodiment of the present disclosure.

FIG. 9A is a diagram illustrating an application example of a signal distributor for supporting a broadband comprising a plurality of bands according to an embodiment of the present disclosure.

FIG. 9A may enable signal transmission and reception in a frequency band equal to or greater than two frequency bands described above, based on the signal distributor of FIG. 5A or 5B described above, but by implementing the added stub circuit as a multi-stage as in 910.

Figure 9B:
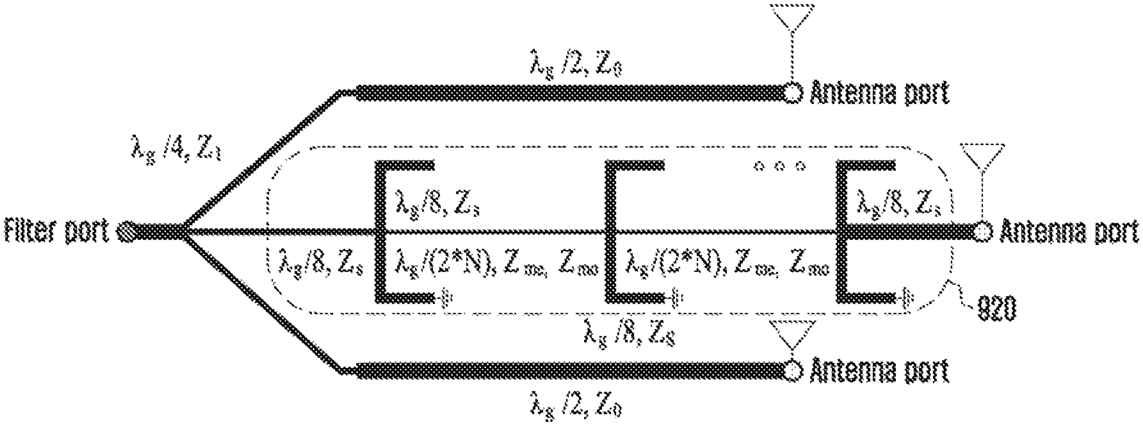
FIG. 9B illustrates an application example of a signal distributor for solving a phase offset problem according to an embodiment of the present disclosure.

FIG. 9B is a diagram illustrating an application example of a signal distributor for solving a phase offset problem according to an embodiment of the present disclosure.

FIG. 9B may enable signal transmission and reception without a phase offset problem in a frequency band equal to or greater than two frequency bands described above, based on the signal distributor of FIG. 6A described above, but by implementing the added stub circuit as a multi-stage as in 920. A stub circuit added as illustrated in FIGS. 9A and 9B may be implemented as a multi-stage in the signal distributor of FIG. 7.

According to various embodiments as described above, broadband communication including a plurality of frequency bands may be stably supported through one antenna module, thereby reducing antenna installation space and facility investment costs. The embodiments of the present disclosure disclosed herein are merely specific examples provided to explain the technical contents of the present disclosure and help understand the present disclosure, and are not intended to limit the scope of the present disclosure. For example, it will be understood that other modified examples based on the technical idea of the present disclosure may be implemented. In addition, each of the above embodiments may be implemented and operated in combination with each other as necessary. For example, a base station and a terminal may be operated by combining parts of the methods proposed in the present disclosure with each other.

What is claimed is:

1. An antenna module comprising:

a sub-array including a first antenna element, a second antenna element, and a third antenna element, each of the first antenna element, the second antenna element, and the third antenna element comprising a first feeding portion and a second feeding portion that are crossed diagonally with each other;

a first signal distributor configured to distribute a first radio frequency (RF) signal to the first feeding portion of each of the first antenna element, the second antenna element, and the third antenna element;

a second signal distributor configured to distribute a second RF signal to the second feeding portion of each of the first antenna element, the second antenna element, and the third antenna element;

first stub circuitry connected to transmission lines of the first signal distributor, which are connected to the first feeding portion of each of the first antenna element, the second antenna element, and the third antenna element; and second stub circuitry connected to a transmission line of the second signal distributor, which is connected to the second feeding portion of the third antenna element, wherein a first direction of the second feeding portion of the first antenna element and a second direction of the second feeding portion of the second antenna element are opposite to a third direction of the second feeding portion of the third antenna element.

2. The antenna module of claim 1, wherein the first antenna element and the second antenna element are spaced apart from each other by a predetermined distance, and wherein the third antenna element is disposed at a center between the first antenna element and the second antenna element.

3. The antenna module of claim 1, wherein the first RF signal distributed by the first signal distributor is fed to each of the first antenna element, the second antenna element, and the third antenna element, through a direction of the first feeding portion.

4. The antenna module of claim 3, wherein the second RF signal distributed by the second signal distributor is fed to each of the first antenna element and the second antenna element, through the second direction of the second feeding portion, and wherein the second RF signal distributed by the second signal distributor is fed to the third antenna element through the third direction opposite to the second direction of the second feeding portion.

5. The antenna module of claim 4, wherein the second stub circuitry is used for changing a phase of the second RF signal fed to the third antenna element.

6. The antenna module of claim 1, wherein the first stub circuitry comprises an open stub circuit and a short stub circuit that are connected in parallel to an end of a high-impedance short-line element.

7. The antenna module of claim 6, wherein the second stub circuitry comprises an open stub circuit and a short stub circuit that are connected in parallel to both ends of a high-impedance short-line element.

8. A base station comprising:

an antenna module comprising:

a sub-array including a first antenna element, a second antenna element, and a third antenna element, each of the first antenna element, the second antenna element, and the third antenna element comprising first feeding portion and second feeding portion that are crossed diagonally with each other;

a first signal distributor configured to distribute a first radio frequency (RF) signal to the first feeding portion of each of the first antenna element, the second antenna element, and the third antenna element;

a second signal distributor configured to distribute a second RF signal to the second feeding portion of each of the first antenna element, the second antenna element, and the third antenna element;

first stub circuitry connected to transmission lines of the first signal distributor, which are connected to the first feeding portion of each of the first antenna element, the second antenna element, and the third antenna element; and second stub circuitry connected to a transmission line of the second signal distributor, which is connected to the second feeding portion of the third antenna element, wherein a first direction of the second feeding portion of the first antenna element and a second direction of the second feeding portion of the second antenna element are opposite to a third direction of the second feeding portion of the third antenna element.

9. The base station of claim 8, wherein the first antenna element and the second antenna element are spaced apart from each other by a predetermined distance, and wherein the third antenna element is disposed at a center between the first antenna element and the second antenna element.

10. The base station of claim 9, wherein the first RF signal distributed by the first signal distributor is fed to each of the first antenna element, the second antenna element, and the third antenna element through a direction of the first feeding portion.

11. The base station of claim 10, wherein the second RF signal distributed by the second signal distributor is fed to each of the first antenna element and the second antenna element, through the second direction of the second feeding portion, and wherein the second RF signal distributed by the second signal distributor is fed to the third antenna element through the third direction opposite to the second direction of the second feeding portion.

12. The base station of claim 11, wherein the second stub circuitry is used for changing a phase of the second RF signal fed to the third antenna element.

13. The base station of claim 8, wherein first stub circuitry comprises an open stub circuit and a short stub circuit that are connected in parallel to an end of a high-impedance short-line element.

14. The base station of claim 13, wherein the second stub circuitry comprises an open stub circuit and a short stub circuit that are connected in parallel to both ends of a high-impedance short-line element.

* * * * *